(12) United States Patent
Frichot et al.

(10) Patent No.: US 12,052,156 B2
(45) Date of Patent: Jul. 30, 2024

(54) METHOD FOR TESTING DATA TRANSFER IN A WIND POWER SURVEILLANCE SYSTEM

(71) Applicant: VESTAS WIND SYSTEMS A/S, Aarhus (DK)

(72) Inventors: Tommy Frichot, Beder (DK); Fabrice Krøyer-Loudet, Beder (DK); Morten Tim Thorsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/090,129

(22) Filed: Dec. 28, 2022

(65) Prior Publication Data
US 2023/0208742 A1   Jun. 29, 2023

(30) Foreign Application Priority Data
Dec. 28, 2021   (EP) .................................. 21217934

(51) Int. Cl.
*H04L 43/50*   (2022.01)
*F03D 7/04*   (2006.01)
(Continued)

(52) U.S. Cl.
CPC .............. *H04L 43/50* (2013.01); *F03D 7/047* (2013.01); *F03D 17/00* (2016.05);
(Continued)

(58) Field of Classification Search
CPC ... F03D 7/048; F03D 9/17; F03D 9/28; F03D 7/047; F03D 7/049; H04L 47/2416;
(Continued)

(56) References Cited

U.S. PATENT DOCUMENTS

| | | |
|---|---|---|
| 2010/0305767 A1 | 12/2010 | Bengtson |
| 2016/0283307 A1* | 9/2016 | Takeshima .............. H04L 41/14 |
| 2018/0242057 A1 | 8/2018 | Demuth |

FOREIGN PATENT DOCUMENTS

| | | |
|---|---|---|
| CN | 109104323 A  * | 12/2018 |
| EP | 3832953 A1 | 6/2021 |

OTHER PUBLICATIONS

H.-L. Fu and W.-C. Chang, "Wind turbine control monitor system simulation and validation," 2010 International Symposium on Computer, Communication, Control and Automation (3CA), Tainan, Taiwan, 2010, pp. 6-9, doi: 10.1109/3CA.2010.5533734. (Year: 2010).*

(Continued)

*Primary Examiner* — Rachel J Hackenberg
(74) *Attorney, Agent, or Firm* — Patterson + Sheridan, LLP (57) ABSTRACT

Testing data transfer at the application layer of a wind power surveillance computer system. One technique includes preparing a test message with a message id, transferring the test message from a first computer entity to a second computer entity, stamping the test message with a time stamp, when transfer is initiated, stamping the test message with a transfer id and a corresponding transfer time stamp, when the test message is received at the second entity, transferring the test message from the second computer entity at the application layer to the first computer entity, stamping the test message with an arrival time stamp, when the test message arrives at the first entity, storing the message id and the transfer id with corresponding time stamp and corresponding transfer time stamp, and the arrival time stamp, and comparing the stored time stamp with the transfer time stamp and with the arrival time stamp.

20 Claims, 6 Drawing Sheets

(51) Int. Cl.
*F03D 17/00* (2016.01)
*H04L 43/0864* (2022.01)
*H04L 43/106* (2022.01)
*H04L 47/28* (2022.01)

(52) U.S. Cl.
CPC ........ *H04L 43/0864* (2013.01); *H04L 43/106* (2013.01); *H04L 47/28* (2013.01)

(58) Field of Classification Search
CPC ....... H04L 47/283; H04L 47/28; H04L 67/12; H04L 1/0002; H04L 43/0847; H04L 43/0852; H04L 43/00; H04L 43/02; H04L 43/50; H04L 43/0823; H04L 43/0829; H04L 43/04; H04W 4/70
See application file for complete search history.

(56) References Cited

OTHER PUBLICATIONS

G. Swiszcz, A. Cruden, C. Booth and W. Leithead, "A data acquisition platform for the development of a wind turbine condition monitoring system," 2008 International Conference on Condition Monitoring and Diagnosis, Beijing, China, 2008, pp. 1358-1361, doi: 10.1109/CMD.2008.4580521. (Year: 2008).*

Gokhan Kilica, Mehmet S. Unluturk "Testing of wind turbine towers using wireless sensor network and accelerometer" 2015, Elsevier Renewable Energy 75 (Oct. 23, 2014) pp. 318-325 (Year: 2014).*

European Patent Office, Extended European Search Report for European Patent Application No. 21217934.5-1218, dated Jun. 24, 2022.

European Patent Office, Information on Search Strategy for European Patent Application No. 21217934.5-1218, dated Jun. 24, 2022.

* cited by examiner

METHOD FOR TESTING DATA TRANSFER IN A WIND POWER SURVEILLANCE SYSTEM

FIELD OF THE DISCLOSURE

The present disclosure relates to a method for testing data transfer at the application layer of a wind power surveillance computer system. The data transfer is between two computer entities in a data network comprising at least three computer entities. The computer entities comprise at least one wind turbine computer system, at least one data hub, and a data centre arranged remotely from the at least one wind turbine.

BACKGROUND OF THE DISCLOSURE

The number of cyber-attacks experienced on Industrial Control Systems (ICS) has increased exponentially over the last decades. Consequently, the way of communicating with plants is improved e.g., by ensuring that data from the plants are pushed to central servers on the initiative of the SCADA systems. In the same way, requests to the plant are retrieved on the initiative of the SCADA systems. This way of communicating ensures compliance with security standards. However, this also introduces complexity. Communication may be done through several hubs and links, and some of these may be running in different environments. Data send to wind turbine plant or to a data centre may never arrive at the destination and the increased security on the nodes hosting the different instances of the communication components makes it very hard to troubleshoot. This may further be complicated by the fact the IT infrastructure may be owned and operated by several different parties, such as different plant owner, the data centre owner, or other parties.

DESCRIPTION OF THE DISCLOSURE

It is an object of embodiments of the disclosure to provide an improved method of testing data transfer in a wind power surveillance computer system.

The disclosure provides a method for testing data transfer at the application layer of a wind power surveillance computer system, the transfer being between two computer entities in a data network comprising at least three computer entities, the computer entities comprising at least one wind turbine computer system, at least one data hub, and a data centre arranged remotely from the at least one wind turbine, the method comprising the steps of:
preparing a test message with a message id, wherein the test message comprises information identifying it as a test message,
transferring the test message from a first computer entity of the at least three computer entities at the application layer to a second computer entity of the at least three computer entities,
stamping the test message with a time stamp, when transfer is initiated,
stamping the test message with a transfer id and a corresponding transfer time stamp, when the test message is received at the second entity,
transferring the test message from the second computer entity at the application layer to the first computer entity,
stamping the test message with an arrival time stamp, when the test message arrives at the first entity,
storing the message id and the transfer id with corresponding time stamp and corresponding transfer time stamp, and the arrival time stamp, and
comparing the stored time stamp with the transfer time stamp and with the arrival time stamp.

The method for testing data transfer at the application layer of a wind power surveillance computer system, is performed in a data network comprising at least three computer entities, where the computer entities comprise at least one wind turbine computer system, at least one data hub, and a data centre arranged remotely from the at least one wind turbine. The wind power surveillance computer system may form part of a SCADA system.

The testing is carried out at the application layer, where the application layer should be understood as a layer specifying the shared communications protocols and interface methods in a communications network to provide information regarding the application layer and not on the network, where issues may be identified by traditional network tools.

The at least one wind turbine may be erected at part of a wind energy plant. In the present context the term 'wind energy plant' should be interpreted to mean a plurality of wind turbines arranged within a specified geographical area; i.e. a site, where the wind turbines when erected will share some infrastructure, such as internal power grid, connection to an external power grid, substations, access roads, etc. Thus, the wind turbine computer system may be a separate computer system for a single wind turbine or alternatively a computer system for a wind energy plant.

The wind turbine(s) is(are) configured for connection to a power grid having a power demand, which power demand may vary during the day and during the year. The power demand may further vary dependent on a power output from other sources, such as a power output of another wind energy plant and/or power output from other kinds of energy sources, such as conventional power plants, solar power plants, etc.

The data centre arranged remotely from the at least one wind turbine and may be configured for communication with one or more wind turbines, a wind energy plant, or a plurality of plants. As an example, the data centre may be arranged for surveillance of the at least one wind turbine, and/or one or more wind energy plants.

Communication and data transfer between the at least one wind turbine and the data centre may be via one or more data hubs. In the present context the term 'data hub' should be interpreted to mean a node at a data transfer path which the data passes when being transferred e.g., from the wind turbine to the data centre. The data hubs could, e.g., be in the form of wind turbines themselves, data collectors within the wind turbine plant, data sub-stations or relay stations collecting data from multiple wind farms, data analysis centres, etc.

Thus, the provided method is for testing data transfer being between two computer entities in a data network comprising at least three computer entities; e.g. for testing data transfer between a wind turbine computer system and a data hub, between a wind turbine computer system and a data centre arranged remotely from the at least one wind turbine, between a hub and a data centre.

A test message is prepared with a message id to identity the test message. Additionally, the test message comprises information identifying it as a test message, as it may thereby be avoided that commands and/or requests in the test message is carried out. In one embodiment, the information identifying it as a test message may be by including the term 'test' in the subject of the message and/or by including the term 'test' as part of the content of the message. Other types of information may additionally or alternatively be included.

The test message is transferred from a first computer entity of the at least three computer entities at the application layer to a second computer entity of the at least three computer entities, where the first computer entity is one of a wind turbine computer system, a data hub, and a data centre arranged remotely from the at least one wind turbine, and where the second computer entity is another one of a wind turbine computer system, a data hub, and a data centre arranged remotely from the at least one wind turbine.

The test message may be transferred from an application of the first computer entity to an application of the second computer entity. The application may be an application arranged for testing; i.e. a test application. However, the application may alternatively be an application arranged for other purposes which may additionally be used for the method of testing data transfer at the application layer. In one embodiment, a combination of test applications and application arranged for other purposes may be used.

The test message may be prepared at the application layer at the first entity. It should however be understood, that the test message may be prepared at another entity, e.g. at the application layer of the second entity. Alternatively, the test message may be otherwise prepared at the first or second entity or at the data centre, e.g., if the data centre does not constitute the first or second entity. Thus, in one embodiment, the data centre may as an example prepare the test message even if a wind turbine or a hub is the first entity.

When the transfer is initiated, the test message is stamped with a time stamp. The time stamp thereby identifies the time of dispatch.

When the test message is received at the second entity, the test message is stamped with a transfer id and a corresponding transfer time stamp to thereby be able to ensure that the message is received at the second entity and to identify the time used for the transfer. By stamping the test message with a transfer id and a corresponding transfer time stamp, this information regarding arrival at the second entity and a first transfer period; i.e. time spent from dispatch at the first entity to arrival at the second entity, may be stored in the test message and may thereby be carried with the test message, when transferred from the second entity back to the first entity. If the test message is not received, the test message will not be stamped with a transfer id and a corresponding transfer time stamp. The transfer id may be used to verify that the test message has arrived at the second entity as intended. If the test message due to an error in the system arrives at an incorrect entity, this may be identified by a transfer id being incorrect.

Thus, the method comprises a step of stamping the test message with a transfer id and a corresponding transfer time stamp, when the test message is received at the second entity, if the test message is received at the second entity.

Subsequently, the test message is transferred from the second computer entity at the application layer to the first computer entity, whereby the test message is returned to the first entity. When the test message arrives at the first entity, the test message is stamped with an arrival time stamp. If the test message does not arrive, the test message will not be stamped.

Thus, the method comprises a step of stamping the test message with an arrival time stamp, when the test message arrives at the first entity, if the test message arrives at the first entity.

The message id and the transfer id are stored with corresponding time stamp and corresponding transfer time stamp, and the arrival time stamp, when the test message has arrived at the first entity. When stamping the test message with a message id, a transfer id, a corresponding transfer time stamp, and an arrival time stamp, the information may be stored in the test message. The ids and the time stamps may additionally be stored at the first entity.

The stored time stamp is compared with the transfer time stamp and with the arrival time stamp, whereby it may be possible to identify a delay of the test message and/or irregular transfer of a test message.

The test message may be transferred in a flow of test messages to thereby allow to compare transfer of a test message with transfer of another test message and/or with a plurality of test messages. In one embodiment, the test messages in the flow of test messages may be continuously transferred. This may provide an overview of the functioning at the application layer with regard e.g., delay, errors, and the like.

The method may further comprise a step of comparing in the computer system the stored time stamp, transfer time stamp, and arrival time stamp with at least one set of previously stored time stamp, transfer time stamp, and arrival time stamp of a previously test message in the flow of test messages. It may as an example be possible to detect delay of a single message, detect a general delay of every message in a flow, an increasing delay with the number of messages transfer. Dependent on the type and/or frequency of the detected delay, it may be possible to provide a strategy for coming activities. If only a single message is delayed, it may be decided to ignore the delay, whereas a general delay may identify hardware or issues, identify required needs for upgrades of node storage, CPU, bandwidth, etc.

By continuously sending test messages to and from the different entities in the system, self-testing may be arranged in the wind power surveillance computer system. It provides an application layer insight into failures or weaknesses in the data transfer chain by letting each node do continuously testing.

The method may further comprise a step of initiating a delay alert, if a time difference between the time stamp and the arrival time stamp is above a predetermined threshold value. The delay alert may as an example be used as part of planning upgrades of the system.

The method may further comprise a step of monitoring time spent from initiating the transfer of the test message, and a step of initiating an error alert, if the time spent exceed a predetermined arrival threshold value. The step of monitoring the time spent, may include a step of setting a timer and letting the timer run until the threshold value is met or until the test message arrives dependent on which event occurs first. As an example, the predetermined arrival threshold value may be in the approximately of 500 millisecond. It may, however, as an example depend on one or more of the following; bandwidth of the system, the number of hubs, network quality from the Internet provider, etc.

If the test message does not arrive or if the test message arrives after expiry of the time limit; i.e. the time spent exceeds the predetermined arrival threshold value, an error alert is initiate. The error alert may be initiated by the first computer entity.

In one embodiment, the method may further comprise a step of defining in the computer system at least two message categories, where each message category defines a content of a message, and where each test message in the flow of test messages is categorised in one of the message categories depending on the content of the test message.

An as an example, a first message category could be a request for 'operational data' category, where the operational data may be data regarding the operation of the wind turbines, collected while the wind turbines operate. The operational data could, e.g., include power production of the wind turbines, various sensor measurements, e.g., from load sensors, temperature sensors, vibration sensors, wind data, such as wind speed, wind direction, turbulence conditions, gust conditions, etc., at various positions in the wind farm, and/or any other suitable kind of data which provides information regarding the operation of the wind turbines. A second message category could be a command category, e.g., a 'stop wind turbine' command.

The computer system may be configured to select a transfer frequency of the flow of test messages dependent on at least one of a size of the test message, and the message category of the test message. Some test messages may be sent every second, some every 10, seconds, some every 30 seconds, every minute, every second minutes, every 5 minutes, whereas others may be sent every 10 minutes.

As an example, the frequency of the flow of test messages in a request category may e.g., be at least twice the frequency of the flow of test messages in a command category. A test message in the command category may as an example be sent every 30 seconds, whereas a test message in the request category, e.g., a request for sensor data, may be sent every 5 seconds. It should, however, be understood, that the frequency may as an example depend on network quality, and consequently the frequency may be lowered in case of inferior network quality to not clog of the network with test messages.

The frequency of large test messages may on the contrary be only half the frequency of small test messages. It should however be understood that the method may comprise a further test of varying the frequency of the flow of test messages, e.g., in dependency of a delay alert and/or an error alert. In one embodiment, the frequency may be changed in dependency of an alert.

In one embodiment, the computer system may be configured to select a frequency of the flow of test messages dependent on the entity type of at least the first entity. As an example, if the data centre is the first entity, the frequency of the flow of test messages may be higher than if a hub or a wind turbine is the first entity. This may be particularly relevant, if the data centre is arranged for surveillance of the at least one wind turbine, and/or one or more wind energy plants.

The method may further comprise a step of transferring stored data comprising a message id, a transfer id, with corresponding time stamp and corresponding transfer time stamp, and an arrival time stamp for a test message to the data centre for monitoring of transfer of the test message. At the data centre, stored data for a test message may be compared to stored data from another test message or to stored data from a plurality of test messages, thereby enabling troubleshooting in case of errors and/or delays and enabling surveillance of the transfer.

Thus, the method may comprise a further step of comparing in the computer system a time stamp, a transfer time stamp, and an arrival time stamp for one test message with at least a time stamp, a transfer time stamp, and an arrival time stamp for another test message.

In one embodiment, the transfer of stored data to the data centre may be dependent on a time difference between the time stamp and the arrival time stamp. Consequently, data may be ranked e.g., so that only data for delayed test messages and/or data for test message for which an error alert is generated are transferred to the data centre, whereas data for non-delayed test message is not transferred.

The method may comprise a step of transferring the delay alert to the data centre for monitoring of transfer of the test message. Likewise, may the method comprise a step of transferring the error alert to the data centre for monitoring of transfer of the test message.

By transferring the delay alert and/or the error alert, these alerts may form part of the monitoring of the surveillance system and may enable e.g., troubleshooting.

BRIEF DESCRIPTION OF THE DRAWINGS

Embodiments of the disclosure will now be further described with reference to the drawings, in which.

DETAILED DESCRIPTION OF THE DRAWINGS

It should be understood that the detailed description and specific examples, while indicating embodiments of the disclosure, are given by way of illustration only, since various changes and modifications within the spirit and scope of the disclosure will become apparent to those skilled in the art from this detailed description.

Figure 1:
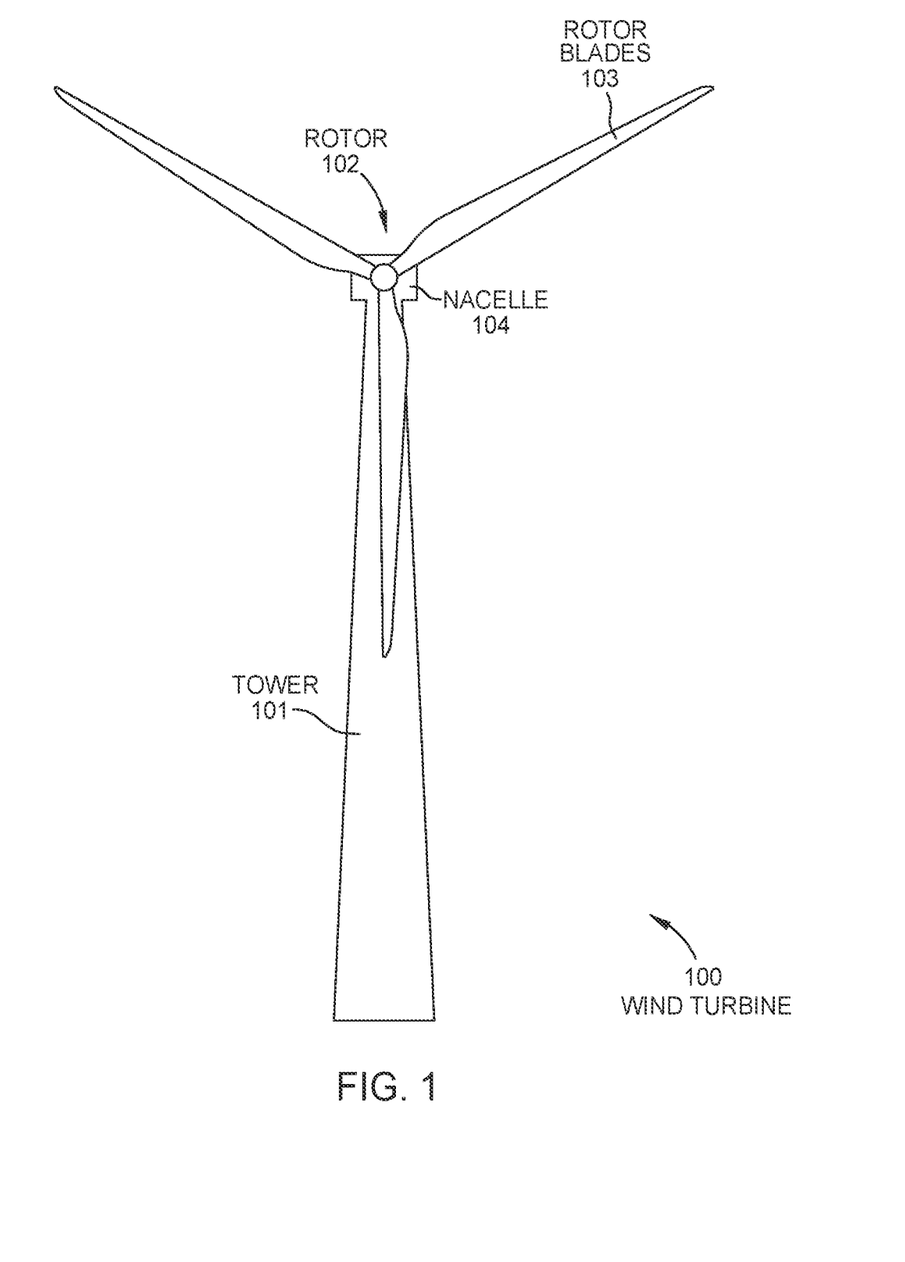
FIG. 1 illustrates a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request. The blades 103 can be pitched in order to alter the aerodynamic properties of the blades, e.g., in order to maximize uptake of the wind energy and to ensure that the rotor blades are not subjected to too large loads when strong winds are blowing. The blades are pitched by a pitch system with a pitch force system controlled by a pitch control system, where the pitch force system includes actuators for pitching the blades dependent on a pitch request from the pitch control system.

Figure 2:
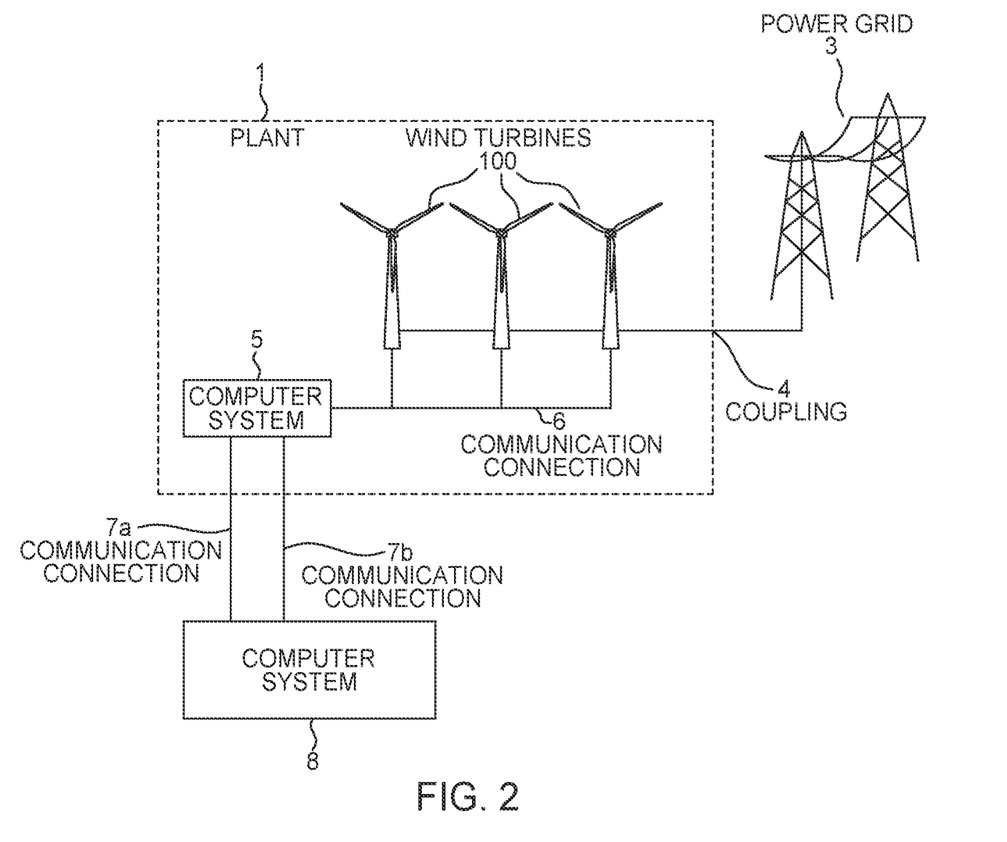
FIG. 2 illustrates a wind energy plant comprising a plurality of wind turbines, FIG. 3 schematically illustrates different elements of a wind power surveillance computer system, FIG. 4 schematically illustrates transfer of two test messages, FIG. 5 schematically illustrates transfer of a test message.

FIG. 2 is a diagrammatic view of a wind energy plant 1 comprising a plurality of wind turbines 100, three of which are shown. The wind turbines 100 are connected to a power grid 3 via a point of common coupling 4. Accordingly, the power produced by the wind turbines 2 is supplied to the power grid 3.

The wind turbines 100 are further connected to a central plant computer system 5 via a communication connection 6, thereby allowing data collected at the wind turbines 2 to be communicated to the central plant computer system 5. The central plant computer system 5 may comprise a SCADA server, a power plant controller (PPC), or any other suitable kind of central unit for control and/or supervision of the wind turbines.

The central plant computer system at the wind energy plant 1 is in communication with an external computer system 8 via communication connections 7a, 7b, where communication connection 7a is for communication from the central computer system 5 to the external computer system 8, whereas the communication connection 7b is for communication from the external computer system 8 to the central computer system 5.

Figure 3:
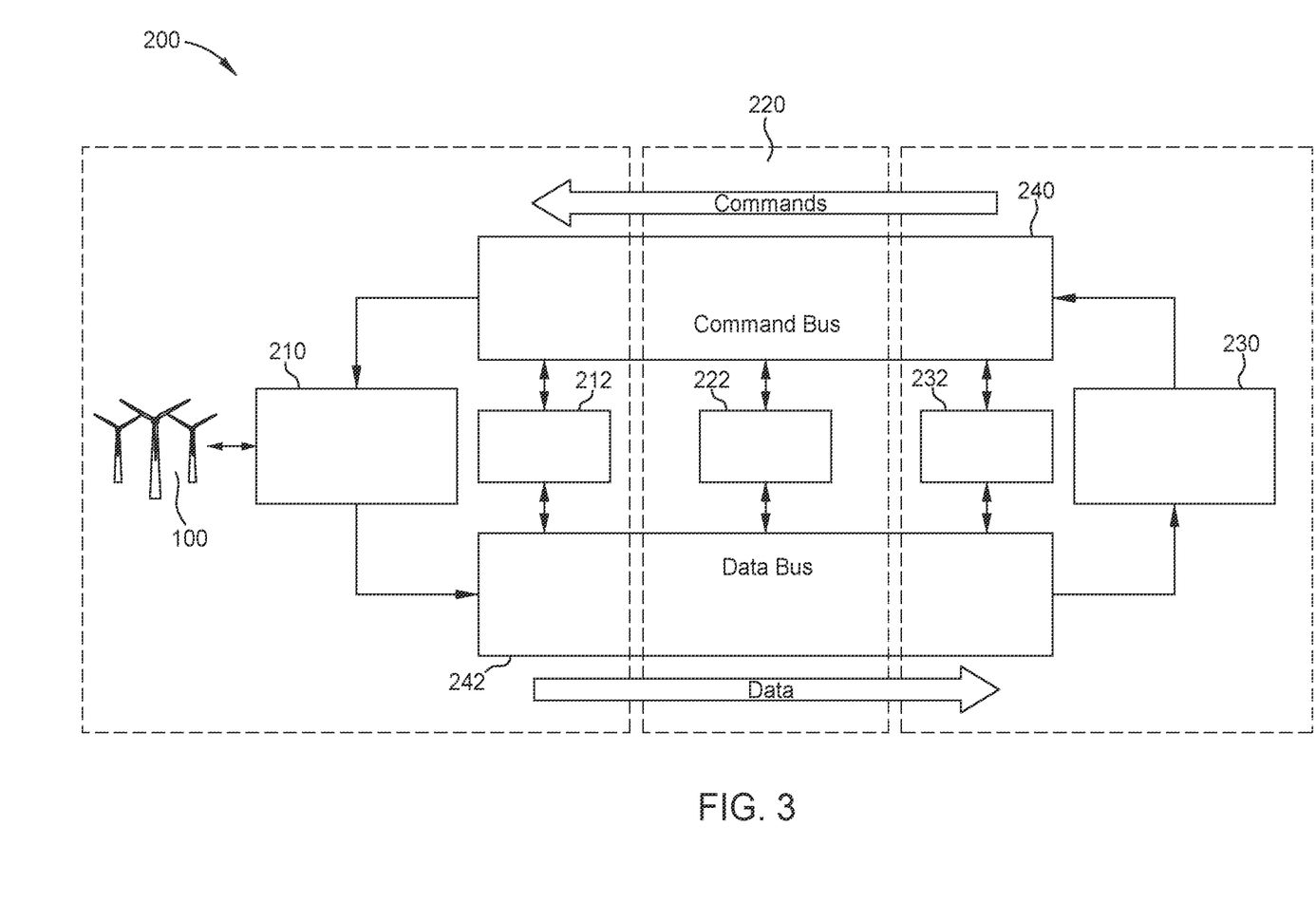

FIG. 3 schematically illustrates different elements of a data network 200 comprising a wind power surveillance computer system. The transfer of test messages is between two computer entities 210, 220, 230 in the data network 200 comprising at least three computer entities 210, 220, 230. In the illustrated embodiment, the computer entities comprising a wind turbine computer system 210, at least one data hub 220, and a data centre 230 arranged remotely from the wind turbines 100. Thus, test messages may be between a wind turbine computer system 210 and a data hub 220, between a wind turbine computer system 210 and a data centre 230 arranged remotely from the at least one wind turbine, and between a data hub 220 and a data centre 230. Each of the wind turbine computer system 210, the at least one data hub 220, and the data centre 230 may be the first entity and may be the second entity dependent on from where the test message is sent.

The wind turbine computer system 210 is integrated in the central computer system 5 (see FIG. 2), whereas the at least one data hub 220, and the data centre 230 forms part of the external computer system 8 (see FIG. 2). Communication may be carried out via the Command Bus 240 and the Data Bus 242.

When performing the method step in the method for testing data transfer at the application layer of a wind power surveillance computer system, the test message is transferred between two computer entities in the data network 200; i.e., between a first computer entity 210, 220, 230 and a second computer entity 210, 220, 230.

In the illustrated embodiment, the test message is transferred from an application 212, 222, 232 of the first computer entity 210, 220, 230 to an application 212, 222, 232 of the second computer entity 210, 220, 230. For illustration, the application is arranged next to the entity. The lines with arrows illustrate communication routes. As an example, a message, such as a test message, may be sent from the application 222 of the data hub 220 to the wind turbine computer system 210 via the Command Bus 240. It should be understood, that communication may be limited in order to ensure that messages can only be sent to the wind turbine computer system by request from the wind turbine computer system to minimise the risk of unwanted access hereto. Thus, the lines with arrows illustrate communication routes, but not initiative for the communication.

Figure 4:
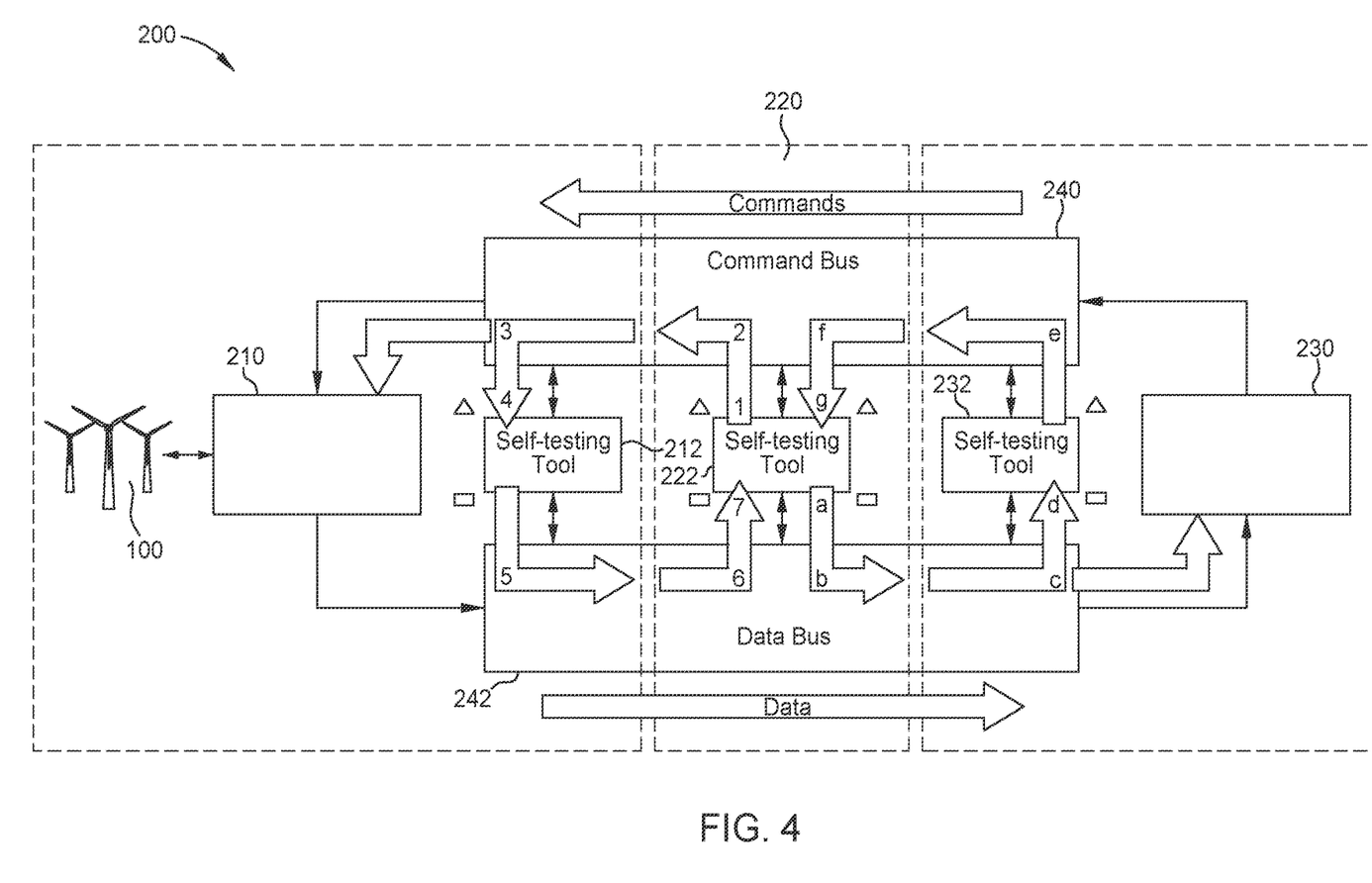

FIG. 4 schematically illustrates transfer of two test messages. One test message is transferred from the application 222 at the hub 220 (illustrated by the arrows 1-2 and 3-4) to the application 212 at computer entity 210 the wind turbine plant, and back to the application 222 (illustrated by the arrows 5 and 6-7). The other test message is transferred from the application 222 at the hub 220 (illustrated by the arrows a-b and c-d) to the application 232 at computer entity 230 the data centre, and back to the application 222 (illustrated by the arrows e and f-g).

The test message is prepared with a message id at the hub 222, and subsequently transferred to the computer entity 210 of the wind turbine plant and the data centre 230, respectively. When the transfer is initiated, the test message is stamped with a time stamp.

When the test message received at the second entity 210, 230, respectively, the test message is stamped with a transfer id and a corresponding transfer time stamp. Subsequently, the test message is transferred from the second computer entity 210, 230, respectively, at the application layer to the first computer entity 220, where the test message is stamped with an arrival time stamp, when the test message arrives.

The message id and the transfer id with corresponding time stamp and corresponding transfer time stamp, and the arrival time stamp is stored upon arrival. And the stored time stamp is compared with the transfer time stamp and with the arrival time stamp.

Additionally, the stored data comprising a message id, a transfer id, with corresponding time stamp and corresponding transfer time stamp, and an arrival time stamp are transferred to the data centre 230 (illustrated by the arrow 250) for monitoring of transfer of the test message. At the data centre 230, stored data for a test message can be compared with stored data from another test message or to stored data from a plurality of test messages, thereby enabling troubleshooting in case of errors and/or delays and enabling surveillance of the transfer.

Figure 5:
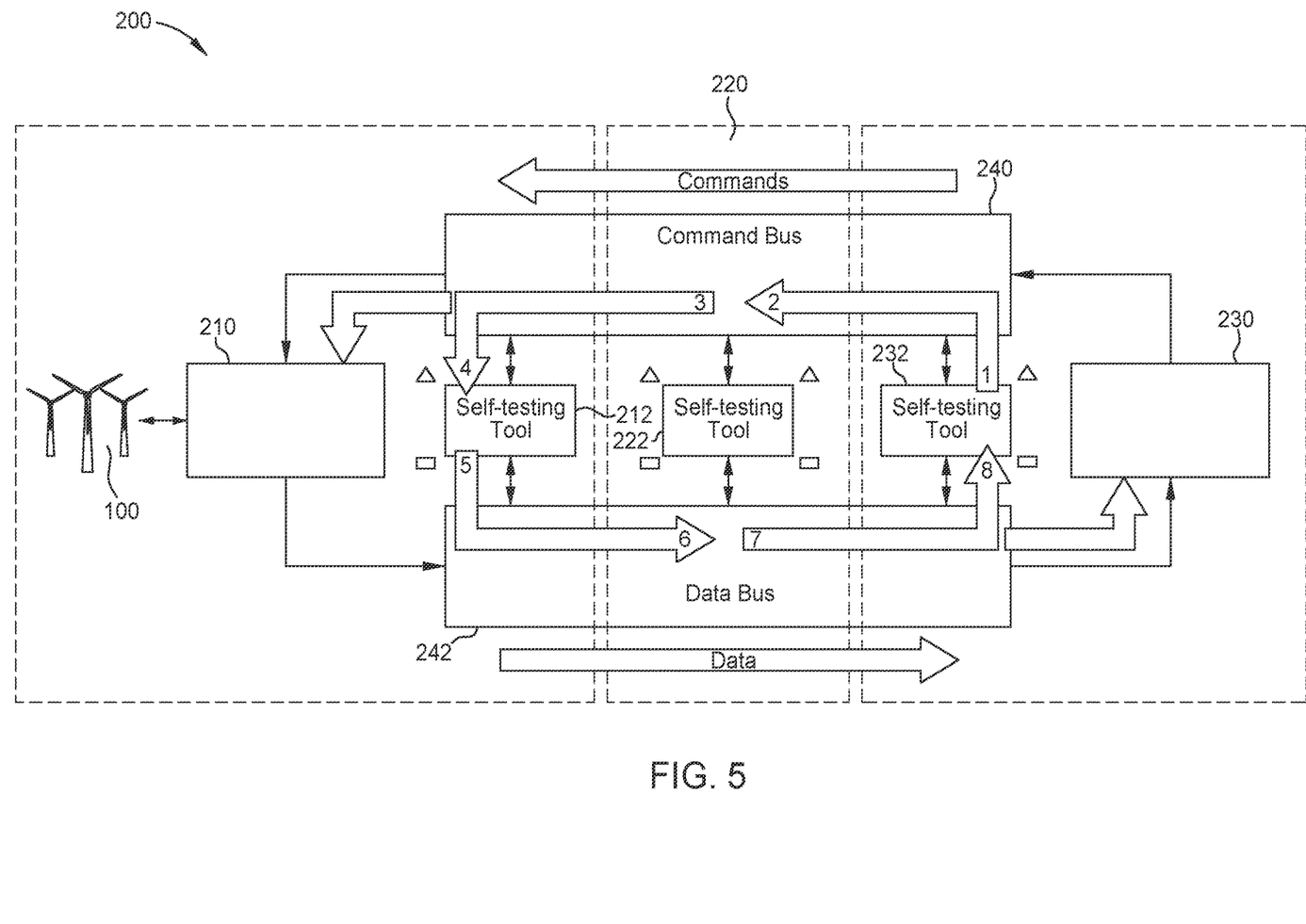

FIG. 5 schematically illustrates transfer of a test message from the application 232 at the data centre 230 (illustrated by the arrows 1-2 and 3-4) to the application 212 at computer entity 210 the wind turbine plant, and back to the application 232 (illustrated by the arrows 5-6 and 7-8). Stored data comprising a message id, a transfer id, with corresponding time stamp and corresponding transfer time stamp, and an arrival time stamp are transferred from the application 232 of the data centre to another part of the data centre 230 (illustrated by the arrow 250).

Figure 6:
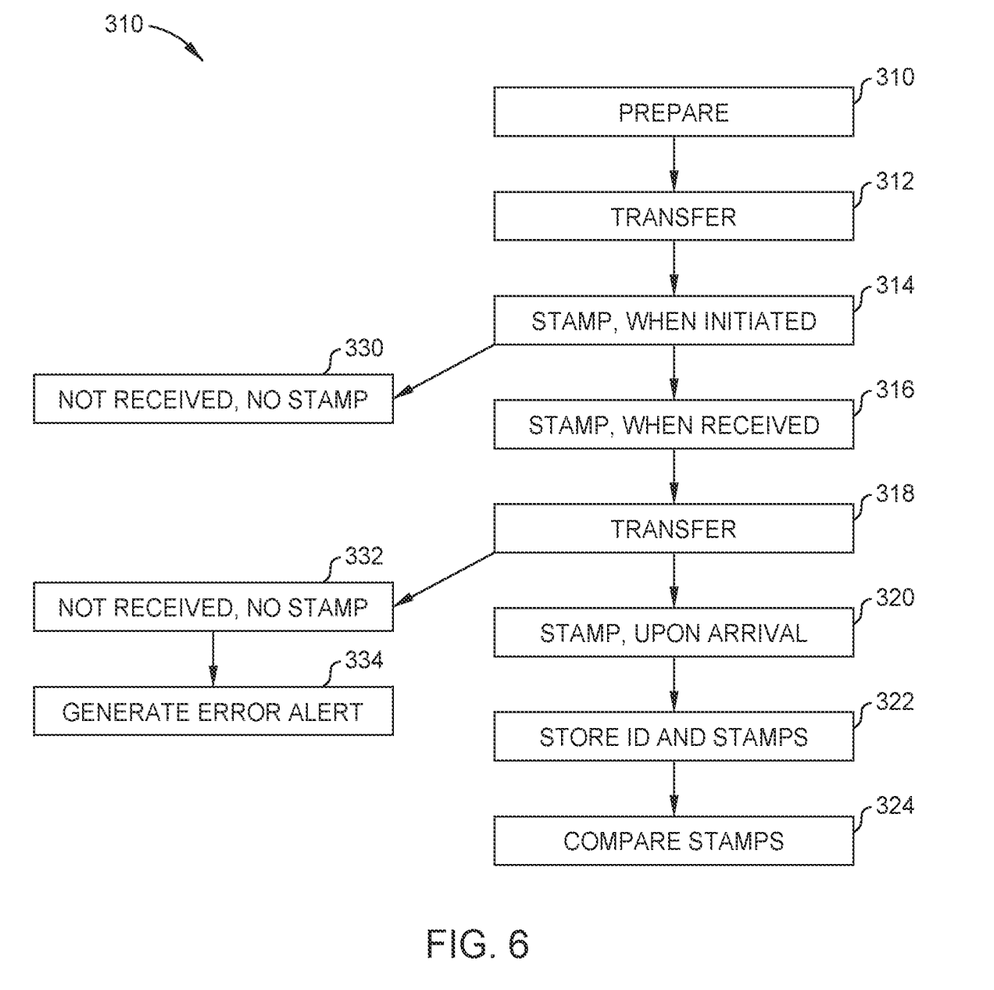
FIG. 6 is a flow chart illustrating a method for testing data transfer at the application layer of a wind power surveillance computer system.

FIG. 6 is a flow chart illustrating a method 300 for testing data transfer at the application layer of a wind power surveillance computer system, the transfer being between two computer entities 210, 220, 230 in a data network 200 comprising at least three computer entities 210, 220, 230, the computer entities comprising at least one wind turbine computer system 210, at least one data hub 220, and a data centre 230 arranged remotely from the at least one wind turbine, the method 300 comprising the steps of:

preparing 310 a test message with a message id, wherein the test message comprises information identifying it as a test message, transferring 312 the test message from a first computer entity 210, 220, 230 of the at least three computer entities 210, 220, 230 at the application layer to a second computer entity 210, 220, 230 of the at least three computer entities 210, 220, 230, stamping 314 the test message with a time stamp, when transfer is initiated, stamping 316 the test message with a transfer id and a corresponding transfer time stamp, when the test message is received at the second entity 210, 220, 230, transferring 318 the test message from the second computer entity 210, 220, 230 at the application layer to the first computer entity 210, 220, 230, stamping 320 the test message with an arrival time stamp, when the test message arrives at the first entity 210, 220, 230, storing 322 the message id and the transfer id with corresponding time stamp and corresponding transfer time stamp, and the arrival time stamp, and comparing 324 the stored time stamp with the transfer time stamp and with the arrival time stamp.

If the test message is not received at the second entity 210, 220, 230, the test message will not be stamped with a transfer id and a corresponding transfer time stamp 330.

Likewise, if the test message does not arrive at the first entity 210, 220, 230, the test message will not be stamped with an arrival time stamp 332. Subsequently, an error alert is generated 334.

The invention claimed is:

1. A method for testing data transfer at an application layer of a wind power surveillance computer system, the data transfer being between two computer entities in a data network, the data network comprising at least three computer entities, the at least three computer entities comprising at least one wind turbine computer system, at least one data hub, and a data center arranged remotely from the at least one wind turbine computer system, the method comprising:

preparing a message with a message identifier, wherein the message comprises information identifying the message as a test message;

transferring the message from a first computer entity of the at least three computer entities at the application layer to a second computer entity of the at least three computer entities, wherein a transfer frequency of the message is determined based at least in part on one of (i) a size of the message, (ii) a message category of the message, or (iii) an entity type of the first computer entity;

stamping the message with an initiation time stamp, when the data transfer is initiated;

stamping the message with a transfer identifier and a corresponding transfer time stamp, when the message is received at the second computer entity;

transferring the message from the second computer entity at the application layer to the first computer entity;

stamping the message with an arrival time stamp, when the message arrives at the first computer entity;

storing the message identifier with the initiation time stamp, the transfer identifier with the transfer time stamp and the arrival time stamp;

and comparing the initiation time stamp with the transfer time stamp and with the arrival time stamp.

2. The method of claim 1, wherein the test message is transferred in a flow of test messages.

3. The method of claim 2, further comprising comparing in the computer system the initiation time stamp, the transfer time stamp, and the arrival time stamp with at least one set of previously stored initiation time stamp, transfer time stamp, and arrival time stamp of a previous test message in the flow of test messages.

4. The method of claim 3, further comprising initiating a delay alert, if a time difference between the initiation time stamp and the arrival time stamp is above a predetermined threshold value.

5. The method of claim 1, further comprising monitoring time spent from initiating the data transfer of the test message, and initiating an error alert, if the time spent exceed a predetermined arrival threshold value.

6. The method of claim 2, wherein the test messages in the flow of test messages are continuously transferred.

7. The method of claim 1, wherein the test message is prepared in the application layer at the first computer entity.

8. The method of claim 6, further comprising defining in the computer system at least two message categories, each defining a content of a test message, wherein each test message in the flow of test messages is categorized in one of the message categories depending on the content of the test message.

9. The method of claim 1, further comprising transferring stored data comprising a message identifier, with corresponding time initiation stamp, a transfer identifier, with corresponding transfer time stamp, and an arrival time stamp for the test message to the data center for monitoring of transfer of the test message.

10. The method of claim 9, wherein the transfer of stored data is dependent on a time difference between the time stamp and the arrival time stamp.

11. The method of claim 9, further comprising comparing in the computer system a time stamp, a transfer time stamp, and an arrival time stamp for one test message with at least a time stamp, a transfer time stamp, and an arrival time stamp for another test message.

12. The method of claim 4, further comprising transferring the delay alert to the data center for monitoring of transfer of the test message.

13. The method of claim 5, further comprising transferring the error alert to the data center for monitoring of transfer of the test message.

14. A system for testing data transfer at an application layer of a wind power surveillance computer system, the data transfer being between two computer entities in a data network, the data network comprising at least three computer entities, the at least three computer entities comprising at least one wind turbine computer system, at least one data hub, and a data center arranged remotely from the at least one wind turbine computer system, the system comprising:

one or more computer processors;

and one or more memories collectively containing one or more programs which when executed by the one or more computer processors performs an operation, the operation comprising:

preparing a message with a message identifier, wherein the message comprises information identifying the message as a test message;

transferring the message from a first computer entity of the at least three computer entities at the application layer to a second computer entity of the at least three computer entities, wherein a transfer frequency of the message is determined based at least in part on one of (i) a size of the message, (ii) a message category of the message, or (iii) an entity type of the first computer entity;

stamping the message with an initiation time stamp, when the data transfer is initiated;

stamping the message with a transfer identifier and a corresponding transfer time stamp, when the message is received at the second computer entity;

transferring the message from the second computer entity at the application layer to the first computer entity;

stamping the message with an arrival time stamp, when the message arrives at the first computer entity;

storing the message identifier with the initiation time stamp, the transfer identifier with the transfer time stamp, and the arrival time stamp;

and comparing the initiation time stamp with the transfer time stamp and with the arrival time stamp.

15. The system of claim 14, wherein the test message is transferred in a flow of test messages.

16. The system of claim 15, wherein the operation further comprises comparing in the computer system the initiation time stamp, the transfer time stamp, and the arrival time stamp with at least one set of previously stored initiation time stamp, transfer time stamp, and arrival time stamp of a previous test message in the flow of test messages.

17. The system of claim 16, wherein the operation further comprises initiating a delay alert, if a time difference between the initiation time stamp and the arrival time stamp is above a predetermined threshold value.

18. The system of claim 14, wherein the operation further comprises monitoring time spent from initiating the data transfer of the test message, and initiating an error alert, if the time spent exceed a predetermined arrival threshold value.

19. The system of claim 15, wherein the test messages in the flow of test messages are continuously transferred.

20. A non-transitory computer-readable medium containing computer program code that, when executed by operation of one or more computer processors, performs an operation for testing data transfer at an application layer of a wind power surveillance computer system, the data transfer being between two computer entities in a data network, the data network comprising at least three computer entities, the at least three computer entities comprising at least one wind turbine computer system, at least one data hub, and a data center arranged remotely from the at least one wind turbine computer system, the operation comprising:

preparing a message with a message identifier, wherein the message comprises information identifying the message as a test message;

transferring the message from a first computer entity of the at least three computer entities at the application layer to a second computer entity of the at least three computer entities, wherein a transfer frequency of the message is determined based at least in part on one of (i) a size of the message, (ii) a message category of the message, or (iii) an entity type of the first computer entity;

stamping the message with an initiation time stamp, when the data transfer is initiated;

stamping the message with a transfer identifier and a corresponding transfer time stamp, when the message is received at the second computer entity;

transferring the message from the second computer entity at the application layer to the first computer entity;

stamping the message with an arrival time stamp, when the message arrives at the first computer entity;

storing the message identifier with the initiation time stamp, the transfer identifier with the transfer time stamp, and the arrival time stamp;

and comparing the initiation time stamp with the transfer time stamp and with the arrival time stamp.

\* \* \* \* \*